US012128883B2

(12) United States Patent
Yasui

(10) Patent No.: US 12,128,883 B2
(45) Date of Patent: Oct. 29, 2024

(54) DRIVING ASSISTANCE DEVICE, MONITORING DEVICE, DRIVING ASSISTANCE METHOD, AND STORAGE MEDIUM

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 17/848,427

(22) Filed: Jun. 24, 2022

(65) Prior Publication Data

US 2022/0410880 A1 Dec. 29, 2022

(30) Foreign Application Priority Data

Jun. 29, 2021 (JP) ................. 2021-107578

(51) Int. Cl.
*B60W 30/09* (2012.01)
*B60W 10/18* (2012.01)
*B60W 10/20* (2006.01)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 30/02; B60T 8/1755; B62D 15/021; B62D 6/00
See application file for complete search history.

(56) References Cited

U.S. PATENT DOCUMENTS

2006/0113837 A1\* 6/2006 Fukami ................. B60T 8/1755
303/140
2020/0079394 A1 3/2020 Masuda et al.
2020/0117192 A1 4/2020 Satoh et al.

FOREIGN PATENT DOCUMENTS

CN 101581567 A \* 11/2009 ........... B62D 15/021
DE 102017115752 A1 \* 10/2018 ............ B60W 10/18
(Continued)

OTHER PUBLICATIONS

Japanese Office Action for Japanese Patent Application No. 2021-107578 dated Sep. 17, 2024.

*Primary Examiner* — Yuri Kan
(74) *Attorney, Agent, or Firm* — Amin, Turocy & Watson, LLP

(57) ABSTRACT

A driving assistance device includes a storage medium that stores computer-readable instructions, and a processor connected to the storage medium. The processor executes the computer-readable instructions to recognize an object around a moving body, perform first control for avoiding contact between the moving body and the recognized object by steering, perform second control for avoiding contact between the moving body and the recognized object by braking, derive an estimated value of a yaw rate generated in the moving body on the basis of reference information including at least a plurality of types of information different from a measured value of a yaw rate output by a yaw rate sensor mounted on the moving body, and suppress the first control if a deviation between the measured value and the estimated value is greater than a reference.

7 Claims, 5 Drawing Sheets

(52) U.S. Cl.
CPC ..... *B60W 2520/06* (2013.01); *B60W 2520/10* (2013.01); *B60W 2520/14* (2013.01)

(56) References Cited

FOREIGN PATENT DOCUMENTS

| | | | | |
|---|---|---|---|---|
| JP | 07-333242 | | 12/1995 | |
| JP | 2010036857 A | * | 2/2010 | .............. B62D 6/00 |
| JP | 2012-066777 | | 4/2012 | |
| JP | 2018-192865 | | 12/2018 | |
| JP | 2019116144 A | * | 7/2019 | ............ B60W 30/02 |
| WO | 2018/230376 | | 12/2018 | |

* cited by examiner

FIG. 6

| TRAINED MODEL | CONDITION |
|---|---|
| (1, 1, 1) | TIRE PRESSURE : HIGH<br>CUMULATIVE MILEAGE : SHORT<br>ROAD SURFACE $\mu$ : HIGH |
| (2, 1, 1) | TIRE PRESSURE : MEDIUM<br>CUMULATIVE MILEAGE : SHORT<br>ROAD SURFACE $\mu$ : HIGH |
| (3, 1, 1) | TIRE PRESSURE : LOW<br>CUMULATIVE MILEAGE : SHORT<br>ROAD SURFACE $\mu$ : HIGH |
| (1, 2, 1) | TIRE PRESSURE : HIGH<br>CUMULATIVE MILEAGE : MEDIUM<br>ROAD SURFACE $\mu$ : HIGH |
| ... | ... |
| (3, 3, 3) | TIRE PRESSURE : LOW<br>CUMULATIVE MILEAGE : LONG<br>ROAD SURFACE $\mu$ : LOW |

DRIVING ASSISTANCE DEVICE, MONITORING DEVICE, DRIVING ASSISTANCE METHOD, AND STORAGE MEDIUM

CROSS-REFERENCE TO RELATED APPLICATION

Priority is claimed on Japanese Patent Application No. 2021-107578, filed Jun. 29, 2021, the content of which is incorporated herein by reference.

BACKGROUND

Field of the Invention

The present invention relates to a driving assistance device, a monitoring device, a driving assistance method, and a storage medium.

Description of Related Art

Conventionally, there is known a device that determines that a vehicle behavior is disturbed when a difference between a target yaw rate and an actual yaw rate (measured by a yaw rate sensor) is large (PCT International Publication No. WO 2018/230376).

SUMMARY

In the conventional technology, it is not determined whether or not an actual yaw rate is appropriate. Therefore, it may not be possible to appropriately determine the validity of steering avoidance.

The present invention has been made in view of such circumstances, and an object of the present invention is to provide a driving assistance device, a driving assistance method, and a storage medium which can appropriately determine the validity of steering avoidance.

A driving assistance device, a monitoring device, a driving assistance method, and a storage medium according to the present invention employ the following configurations.

(1): A driving assistance device according to one aspect of the present invention includes a storage medium that stores computer-readable instructions and a processor connected to the storage medium, the processor executing the computer-readable instructions to: recognize an object around a moving body; perform first control for avoiding contact between the moving body and the recognized object by steering; perform second control for avoiding contact between the moving body and the recognized object by braking; derive an estimated value of a yaw rate generated in the moving body on the basis of reference information including at least a plurality of types of information different from a measured value of a yaw rate output by a yaw rate sensor mounted on the moving body; and suppress the first control if a deviation between the measured value and the estimated value is greater than a reference.

(2): In the aspect of (1), the processor may derive the estimated value by inputting the reference information collected in the moving body to a trained model trained to output the estimated value of the yaw rate when the reference information is input.

(3): In the aspect of (2), the processor may select one or more trained models that output values close to the measured value from a plurality of trained models trained under different conditions and derive the estimated value on the basis of outputs of the selected one or more trained models.

(4): In the aspect of (3), the conditions may include at least one of state conditions representing a state of the moving body and environmental conditions representing an environment in which the moving body is placed.

(5): In the aspect of (1), the reference information may include at least some of output information of a steering angle sensor mounted on the moving body, output information of a speed sensor mounted on the moving body, and control information output by a movement control device of the moving body.

(6): In the aspect of (1), the reference information may include time-series information that spans a plurality of control timings.

(7): A monitoring device according to another aspect of the present invention includes: a storage medium that stores computer-readable instructions; and a processor connected to the storage medium, the processor executing the computer-readable instructions to: derive an estimated value of a yaw rate generated in a moving body on the basis of reference information including at least a plurality of types of information different from a measured value of a yaw rate output by a yaw rate sensor mounted on the moving body; and output predetermined information if a deviation between the measured value and the estimated value is greater than a reference.

(8): A driving assistance method according to another aspect of the present invention is a driving assistance method using a computer, the method comprising: recognizing an object around a moving body; performing first control for avoiding contact between the moving body and the recognized object by steering; performing second control for avoiding contact between the moving body and the recognized object by braking; deriving an estimated value of a yaw rate generated in the moving body on the basis of reference information including at least a plurality of types of information different from a measured value of a yaw rate output by a yaw rate sensor mounted on the moving body; and suppressing the first control if a deviation between the measured value and the estimated value is greater than a reference.

(9): A computer-readable non-transitory storage medium according to another aspect of the present invention stores a program causing a computer to: recognize an object around a moving body; perform first control for avoiding contact between the moving body and the recognized object by steering; perform second control for avoiding contact between the moving body and the recognized object by braking; derive an estimated value of a yaw rate generated in the moving body on the basis of reference information including at least a plurality of types of information different from a measured value of a yaw rate output by a yaw rate sensor mounted on the moving body; and suppress the first control if a deviation between the measured value and the estimated value is greater than a reference.

According to the above-described aspects (1) to (9), it is possible to perform control in which the validity of steering avoidance is appropriately determined.

BRIEF DESCRIPTION OF THE DRAWINGS

FIG. 6 is a diagram showing an example of a relationship between a trained model and an environment at the time of learning.

DESCRIPTION OF EMBODIMENTS

Hereinafter, embodiments of a driving assistance device, a monitoring device, a driving assistance method, and a storage medium of the present invention will be described with reference to the drawings. The driving assistance device and the monitoring device are mounted on a moving body. The moving body may be, for example, one that moves by itself, such as a four-wheeled vehicle, a two-wheeled vehicle, a micromobility, or a robot, or a portable device such as a smartphone moving by being mounted on a moving body that moves by itself or carried by a person. In the following description, it is assumed that a moving body is a four-wheeled vehicle, and the moving body is referred to as "vehicle M." The monitoring device may be one that operates independently or may be included in the driving assistance device. In the following description, it is assumed that the monitoring device is included in the driving assistance device.

The driving assistance device selectively performs first control for avoiding contact between a moving body and an object by steering and second control for avoiding contact between the moving body and the object by braking or simultaneously performs one or both thereof depending on a situation.

"Avoiding by steering" may be, for example, any one of (1) transmitting a steering direction to a driver by voice or an image to indirectly avoid contact with an object, (2) applying an operating reaction for steering in a direction toward an object, vibration, or the like to a steering wheel (steering operator) to avoid contact with the object as is performed by lane keeping control known as a lane keeping assist system (LKAS), and (3) avoiding contact with an object by the driving assistance device performing autonomous steering control on a steering device (so-called automatic driving). In the following description, it is assumed that the first control is performed by the method (1).

"Avoid by braking" may be, for example, any one of (A) normally performing manual driving, and only when there is a possibility of contact with an object, outputting a braking force to a brake device by performing intervention control and (B) avoiding contact with an object by the driving assistance device performing autonomous braking control on the brake device or the like (so-called automatic driving). In the following description, it is assumed that the second control is performed by the method (A).

First Embodiment

Figure 1:
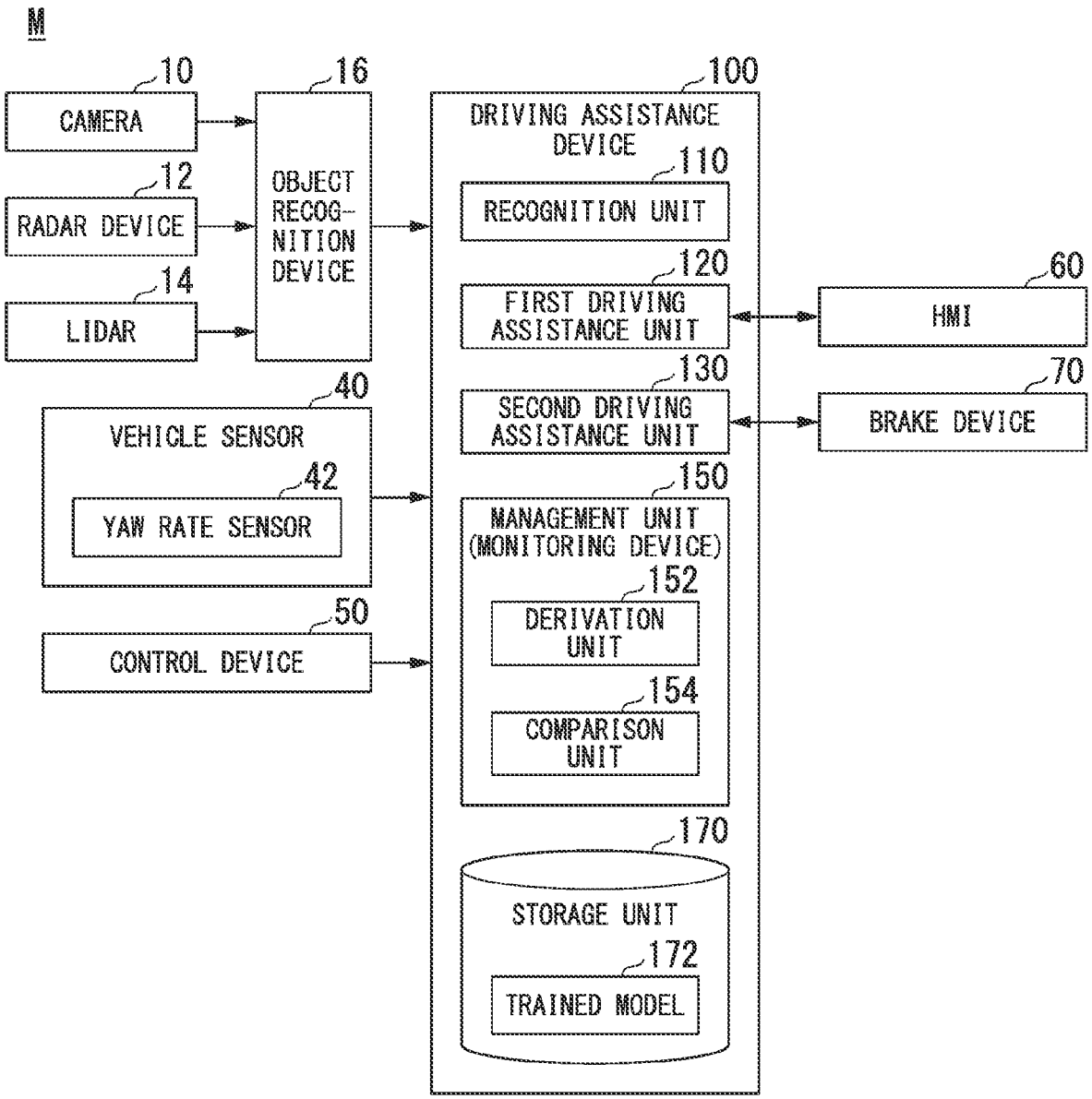
FIG. 1 is a configuration diagram focusing on a driving assistance device.

Hereinafter, a first embodiment will be described. FIG. 1 is a configuration diagram focusing on a driving assistance device 100. In addition to the driving assistance device 100, a vehicle M is equipped with a camera 10, a radar device 12, a Light Detection and Ranging (LIDAR) device 14, an object recognition device 16, a vehicle sensor 40, a control device 50, a human machine interface (HMI) 60, a brake device 70, and the like. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added. For example, the vehicle M may also be equipped with components necessary for manual driving, such as a driving operator such as an accelerator pedal or a brake pedal, a driving force output device such as an engine or a motor, and a steering device, but illustration and detailed description thereof will be omitted.

The camera 10 is a digital camera using a solid-state image sensor such as a charge coupled device (CCD) or a complementary metal oxide semiconductor (CMOS). The camera 10 is attached to an arbitrary portion of the vehicle M. When a front view image is captured, the camera 10 is attached to the upper part of a front windshield, the back surface of a rear-view mirror, and the like. The camera 10 periodically and repeatedly images the surroundings of the vehicle M, for example. The camera 10 may be a stereo camera.

The radar device 12 radiates radio waves such as millimeter waves to the surroundings of the vehicle M and detects radio waves (reflected waves) reflected by an object to detect at least the position (distance and direction) of the object. The radar device 12 is attached to an arbitrary portion on the vehicle M. The radar device 12 may detect the position and velocity of an object by a frequency modulated continuous wave (FM-CW) method.

The LIDAR device 14 radiates light (or electromagnetic waves having a wavelength close to the light) to the surroundings of the vehicle M and measures scattered light. The LIDAR device 14 detects a distance to a target on the basis of a time from light emission to light reception. The radiated light is, for example, a pulsed laser beam. The LIDAR device 14 is attached to an arbitrary portion of the vehicle M.

The object recognition device 16 performs sensor fusion processing on detection results of some or all of the camera 10, the radar device 12, and the LIDAR device 14 and recognizes the position, type, velocity, and the like of an object. The object recognition device 16 outputs the recognition result to the driving assistance device 100. The object recognition device 16 may output the detection results of the camera 10, the radar device 12, and the LIDAR device 14 to the driving assistance device 100 as they are. Further, the vehicle M may not be equipped with the object recognition device 16.

The vehicle sensor 40 includes at least a yaw rate sensor 42 that detects an angular velocity around the vertical axis of the vehicle M. The "vertical axis" is a relative axis of the vehicle M with respect to the vehicle body, which will be a vertical axis when pitching or rolling is not occurring. The yaw rate sensor 42 is provided near the center of gravity of the vehicle M as seen from above.

The vehicle sensor 40 may further include a steering angle sensor that detects a steering angle of the vehicle M (which may be the angle of the steering wheel or an operation angle of the steering wheel), a speed sensor that detects the speed of the vehicle M, a steering torque sensor that detects a torque applied to the steering wheel of the vehicle M, and the like.

The control device 50 is, for example, a control device that controls a driving force output device such as an engine or a motor. The control device 50 also outputs control information (for example, control information indicating a target driving force) provided to the driving force output device to the driving assistance device 100. The control device 50 is an example of a "movement control device" in the claims.

The HMI 60 presents various types of information to an occupant of the vehicle M and receives an input operation performed by the occupant. The HMI 60 includes a speaker, a display device (including a head up display (HUD)), a buzzer, a touch panel, a switch, a key, and the like.

The brake device 70 includes a brake control device, a brake actuator, and the like. The brake actuator may be, for example, an electronically controlled brake actuator that can output a braking force regardless of the amount of operation of the brake pedal. The brake device 70 outputs a braking force to the wheels of the vehicle M on the basis of the amount of operation performed on the brake pedal or autonomously applies a braking force to the wheels of the vehicle M in response to an instruction from the driving assistance device 100. Further, the brake control device of the brake device 70 also outputs control information (for example, control information indicating a target braking force) provided to the brake actuator to the driving assistance device 100. The brake device 70 is another example of "movement control device" in the claims.

The driving assistance device 100 includes, for example, a recognition unit 110, a first driving assistance unit 120, a second driving assistance unit 130, and a management unit 150. The management unit 150 includes a derivation unit 152 and a comparison unit 154. These components are realized by, for example, a hardware processor such as a central processing unit (CPU) executing a program (software). Some or all of these components may be realized by hardware (circuit parts including circuitry) such as a large scale integration (LSI) circuit, an application specific integrated circuit (ASIC), a field-programmable gate array (FPGA), and a graphics processing unit (GPU) or may be realized by software and hardware in cooperation. The program may be stored in advance in a storage device (a storage device including a non-transient storage medium) such as a hard disk drive (HDD) or a flash memory, or may be stored in a removable storage medium (non-transient storage medium) such as a DVD or a CD-ROM and installed by mounting the storage medium in a drive device. The management unit 150 is an example of a "monitoring device" in the claims. The illustrated configuration is merely an example, and the management unit 150 may be included in the first operation assistance unit. The driving assistance device 100 further includes a storage unit 170. The storage unit 170 may be a storage medium that stores the aforementioned program or may be another storage medium. A trained model 172 is stored in the storage unit 170. The storage unit 170 is, for example, an HDD, a flash memory, a random access memory (RAM), or the like.

The recognition unit 110 recognizes a state such as the position, velocity, and acceleration of an object around the vehicle M on the basis of information input from the camera 10, the radar device 12, and the LIDAR device 14 via the object recognition device 16. The position of an object is recognized as, for example, a position on a virtual plane seen from the sky with a representative point (the center of gravity, the center of a drive axis, or the like) of the vehicle M as the origin, and is used for control. The position of the object may be represented by a representative point such as the center of gravity or a corner of the object or may be represented by a represented region. The "state" of an object may include an acceleration or jerk of the object, or a "behavioral state" (for example, whether or not the object is changing lanes or intends to change lanes).

Further, the recognition unit 110 recognizes, for example, a lane (traveling lane) in which the vehicle M is traveling. For example, the recognition unit 110 recognizes a traveling lane on the basis of a position of road lane markings around the vehicle M recognized from an image captured by the camera 10. The recognition unit 110 may recognize a traveling lane by recognizing not only road marking lines but also a traveling road boundary (road boundary) including road lane marking, road shoulders, curbs, a median strip, a guardrail, and the like. The recognition unit 110 recognizes the position and posture of the vehicle M with respect to a traveling lane at the time of recognizing the traveling lane. For example, the recognition unit 110 may recognize a deviation of a reference point of the vehicle M from the center of a lane and an angle formed with respect to a line along the center of the lane in the traveling direction of the vehicle M as a relative position and posture of the vehicle M with respect to the traveling lane. Instead, the recognition unit 110 may recognize the position of the reference point of the vehicle M with respect to any side end portion (road lane marking or road boundary) of the traveling lane, or the like as a relative position of the vehicle M with respect to the traveling lane.

The first driving assistance unit 120 performs the first control for avoiding contact between the vehicle M and an object recognized by the recognition unit 110 by steering. As the first control, the first driving assistance unit 120 generates a target trajectory that can avoid contact with the object and causes a speaker to output speech such as "turn the steering wheel to the right (left)" until a steering angle along the target trajectory is reached to guide a driving operation of a driver. Further, the first driving assistance unit 120 may perform the same guidance by causing an HUD to display an image indicating a direction, for example. The first driving assistance unit 120 may determine to stop the first control when the steering angle along the target trajectory is not reached after a predetermined time has elapsed or the vehicle has traveled a predetermined distance after starting the guidance, and transmit information indicating this to the second driving assistance unit 130. Meanwhile, the target trajectory that can avoid contact with the object may be within a host lane (a lane in which the vehicle M is currently present), or may be accompanied by lane change to another lane. In the latter case, conditions for continuing the first control may be set more severely than in the former case.

The second driving assistance unit 130 performs the second control for avoiding contact between the vehicle M and an object recognized by the recognition unit 110 by braking. As the second control, the second driving assistance unit 130 determines a target stop position for the vehicle M to stop having a certain distance margin for an object for which it is difficult for the vehicle M to avoid contact by steering, determines a braking force (braking torque) on the basis of a deceleration calculated on the premise of constant deceleration and the speed of the vehicle M, for example, and outputs the determined braking force to the brake device 70. The second driving assistance unit 130 may also use an engine brake and a regenerative brake of a motor. The second driving assistance unit 130 may start the second control when information indicating stop of the first control is obtained, or may execute the second control regardless of the operating state of the first driving assistance unit 120. In the latter case, the second driving assistance unit 130 determines whether or not the corresponding object is "an object for which it is difficult for the vehicle M to avoid contact by steering" on the basis of indexes such as the amount of overlap (overlapping amount) between an expected course of the vehicle M and the object, a time to collision (TTC), and the like. Further, even if it is possible to pass by the side of an object according to the first control, autonomous deceleration control may also be performed just in case.

Figure 2:
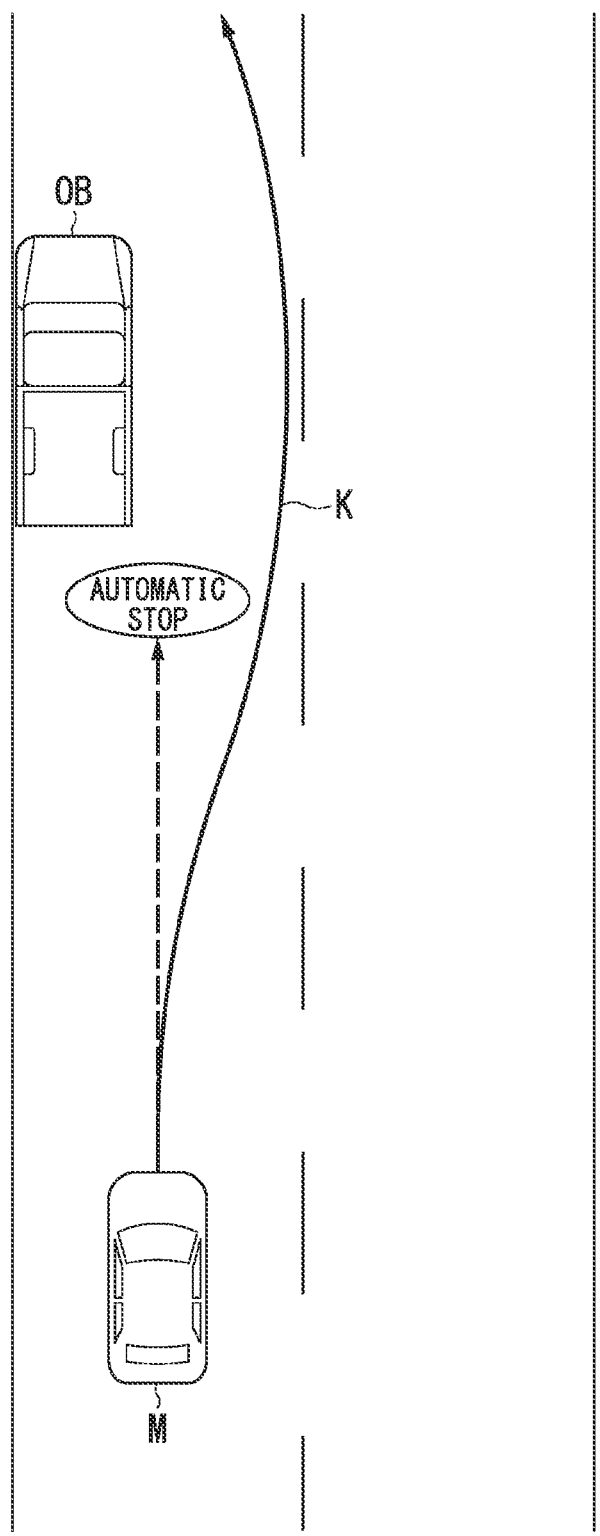
FIG. 2 is a diagram showing an example of a scene in which first control and second control are selectively performed.

FIG. 2 is a diagram showing an example of a scene in which the first control and the second control are selectively performed. In the figure, OB is an object (here, a parked vehicle) and K is a "target trajectory that can avoid contact with the object." As shown in the figure, when the driver of the vehicle M does not follow guidance and does not steer to the right, the second driving assistance unit 130 automatically stops the vehicle M.

The management unit 150 determines whether or not an abnormality has occurred in a measuring means such as the yaw rate sensor 42 and suppresss the first control if it is determined that an abnormality has occurred. "Suppressing the first control" may mean stopping the first control, stopping the first control when it is determined that an abnormality has occurred a plurality of times in succession, stopping only the first control accompanied by lane change to another lane, or the like. In the following description, it is assumed that "suppressing the first control" means stopping the first control.

The derivation unit 152 of the management unit 150 derives an estimated value Yr* of a yaw rate generated in the vehicle M on the basis of reference information including at least a plurality of types of information different from a yaw rate measurement value Yr output by the yaw rate sensor 42. The reference information includes, for example, at least a part of output information θ of a steering angle sensor, output information V of a speed sensor, and control information output by the control device 50 or the brake device 70. Further, the reference information may include information on the weight carried by the vehicle M, such as the number of passengers (which may be an estimated value or a value detected by an in-vehicle camera or the like) and the remaining amount of energy. Further, the reference information may include time-series information that spans a plurality of control timings. Control timing is a time that becomes start trigger when the management unit 150 performs repetitive processing and is, for example, a time that repeatedly arrives at a predetermined cycle.

Figure 3:
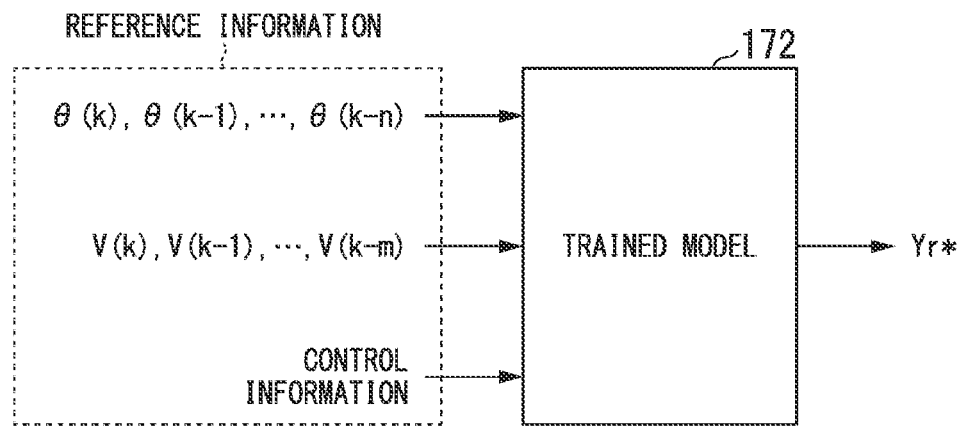
FIG. 3 is a diagram showing an example of details of processing of a derivation unit.

FIG. 3 is a diagram showing an example of details of processing of the derivation unit 152. For example, the derivation unit 152 derives an estimated value Yr* of a yaw rate by inputting reference information including output information θ(k), θ(k−1), . . . θ(k−n) of the steering angle sensor, output information V(k), V(k−1), V(k−m) of the speed sensor, and control information to the trained model 172. θ is a steering angle and V is a speed. (k) indicates that the value has been collected at the current control timing, (k−1) indicates that the value has been collected at previous control timing, and (k−n) indicates that the value has been collected at control timing n times before, and (k−m) indicates that the value has been collected at control timing m times before. Similarly, the control information may be time-series information that spans control timings at a plurality of points in time. When time-series information is not input to the trained model 172, it is desirable that the trained model 172 be a recursive model such as a recurrent neural network (RNN).

The trained model 172 is, for example, a deep neural network (DNN), a radial basis function network (RBFN), or another network type model. The trained model 172 is trained to output an estimated value Yr* of a yaw rate when reference information is input thereto. In this learning process, for example, reference information collected in an experimental vehicle of the same vehicle type as the vehicle M is used as learning data, and measured values from the yaw rate sensor mounted in the experimental vehicle and confirmed to be in a normal state are used as teacher data.

The comparison unit 154 suppresss the first control when a deviation between a measured value Yr of the yaw rate sensor 42 and an estimated value Yr* of a yaw rate derived by the derivation unit 152 is greater than a reference. "Deviation is greater than the reference" means, for example, that the absolute value of the difference is greater than a threshold value.

Figure 4:
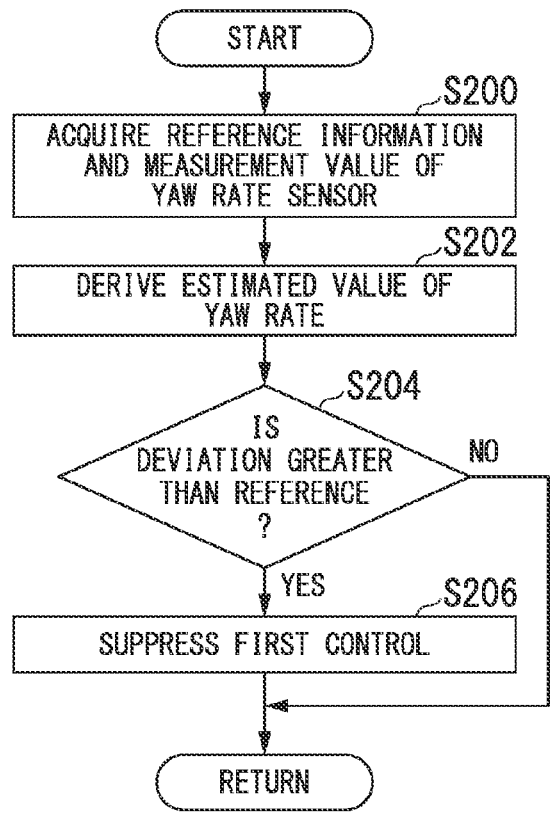
FIG. 4 is a flowchart showing an example of a flow of processing executed by a management unit.

FIG. 4 is a flowchart showing an example of a flow of processing executed by the management unit 150. Processing of this flowchart is repeatedly executed at each control timing.

First, the management unit 150 acquires reference information and a measured value Yr of the yaw rate sensor 42 (step S200). The reference information is stored in the storage unit 170 as time-series information and is used for subsequent processing. Next, the derivation unit 152 derives an estimated value Yr* of a yaw rate by inputting reference information acquired at the current control timing or previous control timing to the trained model 172 (step S202). Next, the comparison unit 154 determines whether or not a deviation between the measured value Yr of the yaw rate sensor 42 and the estimated value Yr* of the yaw rate derived by the derivation unit 152 is greater than a reference (step S204). If the deviation between the measured value Yr of the yaw rate sensor 42 and the estimated value Yr* of the yaw rate is greater than the reference, the comparison unit 154 notifies at least the first driving assistance unit 120 of suppressing of the first control (step S206).

Although the management unit 150 may simply repeat processing of the flowchart shown in FIG. 4 for each control timing, the frequency of determination processing, and the like may be adjusted on the basis of a history of determining that the deviation between the measured value Yr of the yaw rate sensor 42 and the estimated value Yr* of the yaw rate is greater than the reference.

Figure 5:
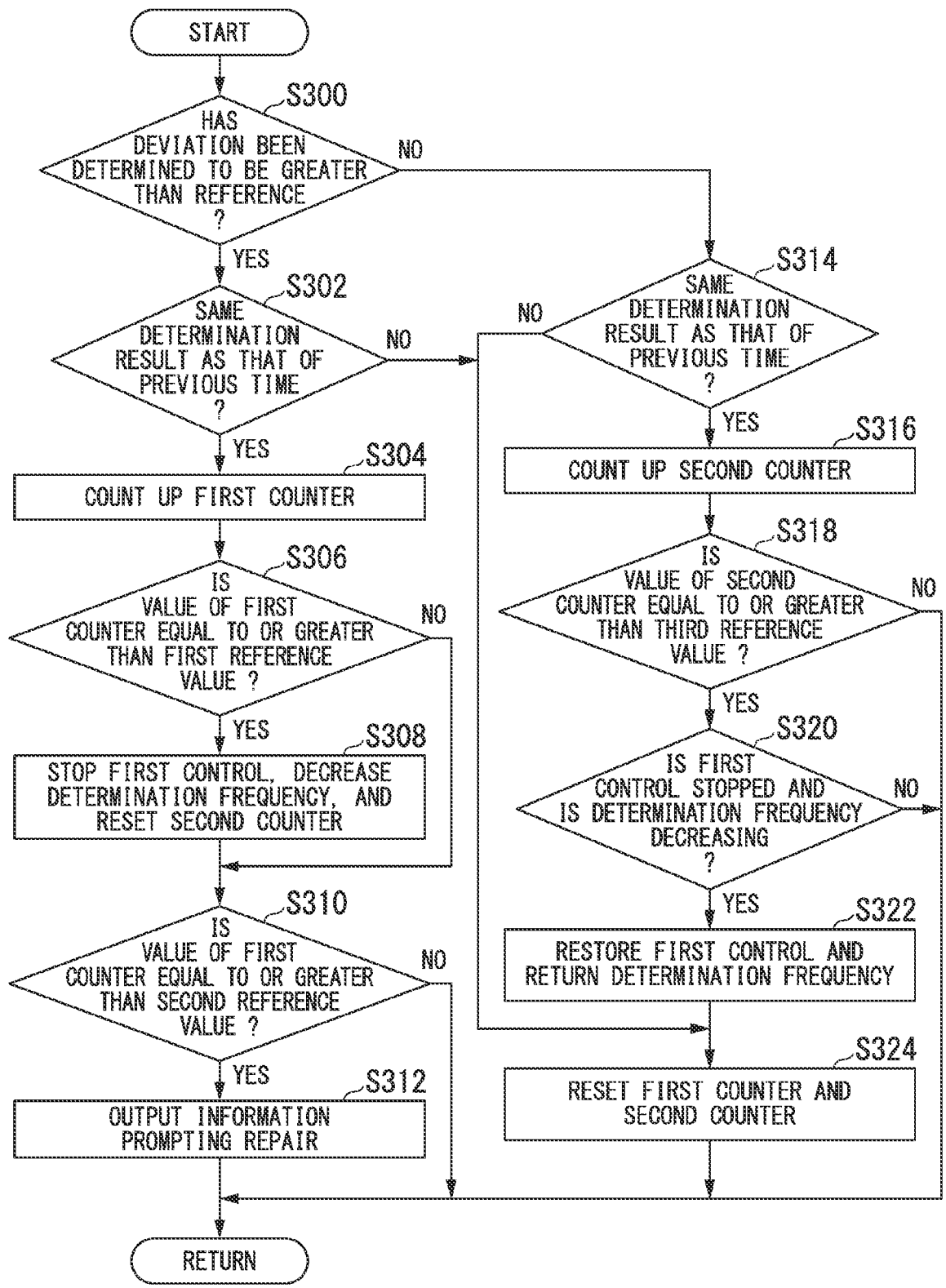
FIG. 5 is a flowchart showing another example of the flow of processing executed by the management unit.

FIG. 5 is a flowchart showing another example of the flow of processing executed by the management unit 150. Processing of this flowchart is repeatedly executed in parallel with processing of the flowchart of FIG. 4.

First, in processing of step S204 of FIG. 4, the management unit 150 determines whether the deviation between the measured value Yr of the yaw rate sensor 42 and the estimated value Yr* of the yaw rate derived by the derivation unit 152 has been determined to be greater than the reference (step S300).

When it is determined that the deviation between the measured value Yr of the yaw rate sensor 42 and the estimated value Yr* of the yaw rate derived by the derivation unit 152 is larger than the reference, the management unit 150 determines whether or not the determination result is the same as that of the previous time (step S302). When it is determined that the determination result is the same as that of the previous time, the management unit 150 counts up (for example, increments by 1) a first counter (step S304). Next, the management unit 150 determines whether or not the value of the first counter is equal to or greater than a first reference value C1 (step S306). The first reference value C1 is, for example, a value of several times to several tens of times. When it is determined that the value of the first counter is equal to or greater than the first reference value C1, the management unit 150 stops the first control, reduces the frequency (determination frequency) of determination processing in steps S200 to S204 of FIG. 4, and resets a value of a second counter (sets the value to zero) (step S308). For example, the management unit 150 normally performs determination processing every several [ms], but reduces the determination frequency to every several [sec] to several [min]. In this state, although determination processing is performed for the deviation between the measured value Yr of the yaw rate sensor 42 and the estimated value Yr* of the yaw rate derived by the derivation unit 152, the first control is not performed regardless of the determination result. This is because it is estimated that there is a high probability that a failure or the like has occurred in the yaw rate sensor 42 or related equipment because the deviation was large a plurality of times in succession.

Further, the management unit 150 determines whether or not the value of the first counter is equal to or greater than the second reference value C2, which is larger than the first reference value C1 (step S310). When it is determined that the value of the first counter is equal to or greater than the second reference value C2, the management unit 150 causes the HMI 60 to output information prompting repair of the yaw rate sensor 42 or related equipment (step S312).

When it is determined that the deviation between the measured value Yr of the yaw rate sensor 42 and the estimated value Yr* of the yaw rate derived by the derivation unit 152 is equal to or less than the reference, the management unit 150 determines whether or not the determination result is the same as that of previous time (step S314). When it is determined that the determination result is the same as that of the previous time, the management unit 150 counts up (for example, increments by 1) the second counter (step S316). Next, the management unit 150 determines whether or not the value of the second counter is equal to or greater than a third reference value C3 (step S318). When it is determined that the value of the second counter is equal to or greater than the third reference value C3, the management unit 150 determines whether or not the first control is stopped and the determination frequency is decreasing according to processing of step S308 (step S320). When a positive determination result is obtained in processing of step S320, the management unit 150 restores the first control and returns the determination frequency (step S322). Then, the management unit 150 resets the values of the first counter and the second counter (step S324). According to such processing, it is possible to cause the first control to be in a temporarily suspended state while the vehicle M is traveling on a road having a bad road surface condition for a certain period of time, and then restore the first control upon sufficiently confirming that the road condition is returned to a normal state.

If it is determined in step S302 or S314 that the determination result is not the same as that of the previous time, processing of step S324 is performed. If a negative determination result is obtained in step S320, the management unit 150 ends processing of one cycle in this flowchart.

According to the first embodiment described above, it is possible to appropriately determine the validity of steering avoidance and perform vehicle control because an estimated value Yr* of a yaw rate generated in the vehicle M is derived on the basis of reference information including at least a plurality of types of information different from a measured value Yr of the yaw rate output by the yaw rate sensor 42 mounted on the vehicle M, and the first control is suppressed when a deviation between the measured value and the estimated value is larger than a reference.

Second Embodiment

Hereinafter, a second embodiment will be described. One model is used as the trained model 172 in the first embodiment, whereas a plurality of trained models trained under different conditions are used in the second embodiment.

Trained models used in the second embodiment are referred to as trained models 172 (i, j, k). Each of the parameters i, j, and k indicates each of conditions in which the trained models are trained, and is a natural number with an upper limit. Although it is assumed that there are three conditions in the following description, the number of conditions may be any number.

The conditions include at least one of a state condition representing the state of the vehicle M and an environmental condition representing the environment in which the vehicle M is placed. The state condition includes, for example, a tire pressure, a cumulative mileage, and the like. This is because the tire pressure directly affects turning sensitivity with respect to the steering operation, and the cumulative mileage indirectly affects a turning degree by causing suspension fatigue. The environmental condition includes, for example, road surface conditions. This is because, when a road surface condition deteriorates (a road surface μ decreases) due to rainfall, an unpaved road, freezing, or the like, a turning degree with respect to a steering angle changes.

FIG. 6 is a diagram showing an example of a relationship between the trained models 172 (i, j, k) and environments at the time of learning. As shown in the figure, a trained model 172 (1, 1, 1) was trained under conditions (tire pressure: high, cumulative mileage: short, road surface μ: high) and a trained model 172. (2, 1, 1) was trained under conditions (tire pressure: medium, cumulative mileage: short, road surface μ: high), and similarly, trained models 172 (i, j, k) for all combinations of parameters are prepared.

The management unit 150 of the second embodiment selects one or more trained models 172 (i, j, k) that output values close to a measured value Yr of the yaw rate sensor 42 and derives an estimate value on the basis of the outputs of the selected one or more trained models 172 (i, j, k). Specifically, the management unit 150 of the second embodiment may select a small number of trained models 172 (i, j, k) known to output values close to the measured value Yr of the yaw rate sensor 42 on the basis of processing results of previous times and derive an estimated value, and used the estimated value for determination, or may derive estimated values Yr* of the yaw rate using some or all of the trained models 172 (i, j, k), select a value close to the measured value Yr of the yaw rate sensor 42 thereamong, and use the selected value for the determination.

As an example, the management unit 150 defines a space composed of a plurality of conditions, for example, allows switching to adjacent conditions, and determines a case where it is necessary to switch more conditions to be abnormal. For example, when a trained model 172 (2, 2, 2) is selected in previous processing, the management unit 150 may allow switching to trained models 172 (1, 2, 2), (3, 2, 2), (2, 1, 2), (2, 3, 2), (2, 2, 1), and (2, 2, 3), if a deviation between an estimated value Yr* of a yaw rate derived by the derivation unit 152 and a measured value Yr of the yaw rate sensor 42 is equal to or less than a reference, determine that "the deviation is equal to or less than the reference," and if not, determine that "the deviation is greater than the reference" using any of the allowed trained models 172 (i, j, k).

Although it is assumed that any one of the trained models 172 (i, j, k) is selected, and a deviation between an estimated value Yr* of a yaw rate derived by the selected trained model 172 (i, j, k) and a measured value Yr of the yaw rate sensor 42 is determined in the above description, the management unit 150 may use the weighted sum of estimated values Yr*(1), Yr*(2), Yr*(3), . . . of the yaw rate derived by a plurality of trained models 172 (i, j, k) as an estimated value Yr* of the yaw rate. In this case, the range of trained models 172 (i, j, k) allowed to be switched may be determined, for example, on the basis of a distance from the position of the center of gravity indicated by the weight of the weighted sum.

According to the second embodiment described above, in addition to achieving the same effects as that of the first embodiment, it is possible to appropriate determine the validity of steering avoidance using an appropriate trained model 172 (i, j, k) in accordance with aging of the vehicle M and perform vehicle control according thereto.

Although forms for carrying out the present invention have been described above using embodiments, the present invention is not limited to such embodiments, and various modifications and substitutions are made without departing from the gist of the present invention.

What is claimed is:

1. A driving assistance device comprising a storage medium that stores computer-readable instructions and a processor connected to the storage medium, the processor executing the computer-readable instructions to:
    recognize an object around a moving body;
    perform first control of the moving body for avoiding contact between the moving body and the recognized object by steering;
    perform second control of the moving body for avoiding contact between the moving body and the recognized object by braking;
    derive an estimated value of a yaw rate generated in the moving body on the basis of reference information including at least a plurality of types of information different from a measured value of a yaw rate output by a yaw rate sensor mounted on the moving body; and
    suppress the first control if a deviation between the measured value and the estimated value is greater than a reference,
    wherein the reference information is time-series information collected in a plurality of control timings, and the reference information includes output information of a steering angle sensor mounted on the moving body, output information of a speed sensor mounted on the moving body, and control information output by a movement control device of the moving body, and
    wherein the processor derives the estimated value by inputting the reference information collected in the plurality of control timings and in the moving body to a trained model trained to output the estimated value of the yaw rate when the reference information is input.

2. The driving assistance device according to claim 1, wherein the processor selects one or more trained models from a plurality of trained models trained under different conditions or selects one or more trained models from the plurality of trained models on the basis of processing results of previous times in the plurality of control timings, and derives the estimated value on the basis of outputs of the selected one or more trained models.

3. The driving assistance device according to claim 2, wherein the conditions include at least one of state conditions representing a state of the moving body and environmental conditions representing an environment in which the moving body is placed.

4. A driving assistance method using a computer, the method comprising:
    recognizing an object around a moving body;
    performing first control of the moving body for avoiding contact between the moving body and the recognized object by steering;
    performing second control of the moving body for avoiding contact between the moving body and the recognized object by braking;
    deriving an estimated value of a yaw rate generated in the moving body on the basis of reference information including at least a plurality of types of information different from a measured value of a yaw rate output by a yaw rate sensor mounted on the moving body; and
    suppressing the first control if a deviation between the measured value and the estimated value is greater than a reference,
    wherein the reference information is time-series information collected in a plurality of control timings, and the reference information includes output information of a steering angle sensor mounted on the moving body, output information of a speed sensor mounted on the moving body, and control information output by a movement control device of the moving body, and
    wherein the deriving of the estimated value comprises deriving the estimated value by inputting the reference information collected in the plurality of control timings and in the moving body to a trained model trained to output the estimated value of the yaw rate when the reference information is input.

5. The driving assistance device according to claim 1, wherein the processor:
    determines whether or not the deviation is greater than the reference;
    when determining that the deviation is greater than the reference, further determines whether or not the determination result is the same as that of a previous timing in the plurality of control timings; and
    when the number of times determined in succession that the determination result is the same as that of a previous timing is equal to or greater than a reference value, stops the first control.

6. A driving assistance device comprising a non-transitory storage medium that stores computer-readable instructions and a processor connected to the non-transitory storage medium, the processor executing:
    recognizing an object around a moving body;
    performing first control of the moving body for avoiding contact between the moving body and the recognized object by steering;
    performing second control of controlling the moving body for avoiding contact between the moving body and the recognized object by braking;
    deriving an estimated value of a yaw rate generated in the moving body on the basis of reference information including at least a plurality of types of information different from a measured value of a yaw rate output by a yaw rate sensor mounted on the moving body; and
    suppressing the first control if a deviation between the measured value and the estimated value is greater than a reference,
    wherein the processor selects one or more trained models from a plurality of trained models trained under different conditions, the different conditions including a state condition representing a state of the moving body and an environmental condition representing environment in which the moving body is placed, and derives the estimated value on the basis of outputs of the selected one or more trained models.

7. The driving assistance device according to claim 6, wherein
the state condition includes at least one of a tire pressure or a cumulative mileage, and
the environmental condition includes a road surface condition due to rainfall, an unpaved road, or freezing.

\* \* \* \* \*